United States Patent [19]

Williams

[11] Patent Number: 4,677,726

[45] Date of Patent: Jul. 7, 1987

[54] MILLING MACHINE APPARATUS

[76] Inventor: Clarence Williams, 2660 Dwight Rd., Memphis, Tenn. 38114

[21] Appl. No.: 831,622

[22] Filed: Feb. 21, 1986

[51] Int. Cl.⁴ .............................................. B23Q 3/10
[52] U.S. Cl. ................................. 29/401.1; 29/426.1; 408/234; 409/192; 409/219; 409/235
[58] Field of Search .............. 409/219, 235, 192, 145, 409/158, 163, 169; 408/234, 43, 53; 144/1 A

[56] References Cited

U.S. PATENT DOCUMENTS 2,816,463 12/1957 Budington et al. ...................... 408/2
3,543,638 12/1970 Braun .................................. 409/219
4,313,478 2/1982 Suzuki ................................. 144/1 A Primary Examiner—Z. R. Bilinsky
Attorney, Agent, or Firm—Walker & McKenzie

[57] ABSTRACT

An elongated carriage extends between the beds of first and second milling machines to operatively join the first and second milling machines to one another. The carriage is attached to the milling machines in a manner which allows longitudinal movement of the carriage with respect to the milling machines to allow the milling machines to simultaneously mill first and second workpieces respectively.

3 Claims, 7 Drawing Figures

MILLING MACHINE APPARATUS

BACKGROUND OF THE INVENTION

1. Field of the Invention:

The present invention relates in general to milling machines.

2. Description of the Related Art:

Various milling machines have heretofore been developed and are well known to thoses skilled in the art. A typical prior art milling machine is shown in FIG. 1 of the drawings and identified by the letter A. The milling machine A is a vertical type milling machine in which the axis of the milling cutter B is substantially vertical. The milling machine A includes a body C for being supported on the floor or other support surface, and a bed D mounted on the body C by an adjustable knee mechanism E which allows vertical adjustments of the bed D. A carriage means F is mounted on the bed D. The carriage mechanism F includes a table G which is longitudinally movable relative to the bed D and milling cutter B. A work holding means H such as a vice or the like is attached to the table G for holding a workpiece I relative to the milling cutter B so that the workpiece I can be fed against the milling cutter B whereby the milling cutter B will remove material from the workpiece I to form a slot J or the like therein. It will be appreciated by those skilled in the art that various modifications to such a milling machine A are known. Thus, for example, the milling machine A may have provisions for a horizontal milling cutter, may be adapted to allow both crosswise and vertical table movement in addition to longitudinal table movement, and may be provided with a plurality of spindles for holding a plurality of milling cutters to perform a plurality of different cuts in the workpiece I simultaneously.

SUMMARY OF THE INVENTION

The present invention is directed toward providing an improved and modified milling machine apparatus. The concept of the present invention is to operatively join a pair of milling machines relative to one another so that one machinist can simultaneously mill a workpiece with each milling machine.

The milling machine apparatus of the present invention comprises, in general, a first milling machine including a rotating milling cutter, a bed, and a first drive component; a second milling machine including a rotating milling cutter and a bed; a carriage means extending between the beds of the first and second milling machines for operatively joining the first and second milling machines relative to one another, the carriage means including an elongated table attached to the beds of the first and second milling machines in a manner which allows longitudinal movement of the table relative to the milling cutters of the first and second milling machines, the carriage including a second drive component coupled to the first drive component of the first milling machine for coacting with the first drive component to cause longitudinal movement of the table relative to the milling cutters of the first and second milling machines; a first work holding means attached to the table for holding a first workpiece with respect to the milling cutter of the first milling machine; and a second work holding means attached to the table for holding a second workpiece with respect to the milling cutter of the second milling machine.

DESCRIPTION OF THE PREFERRED EMBODIMENT

Figure 4:
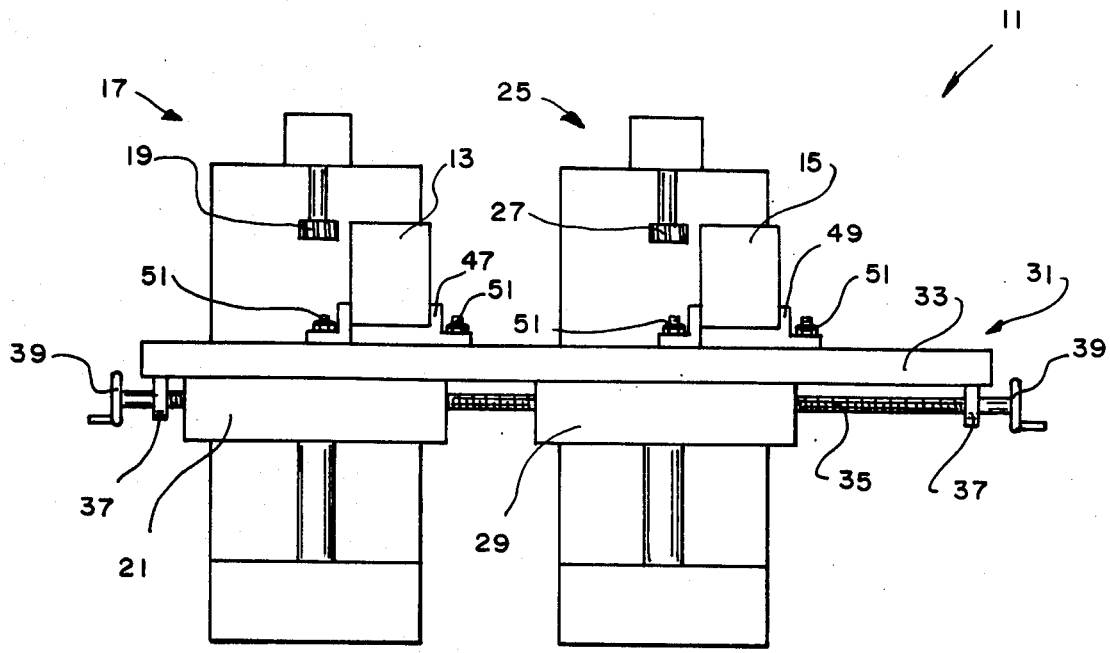
FIG. 4 is a front elevational view of the milling machine apparatus of the present invention with first and second workpieces attached thereto.
Figure 5:
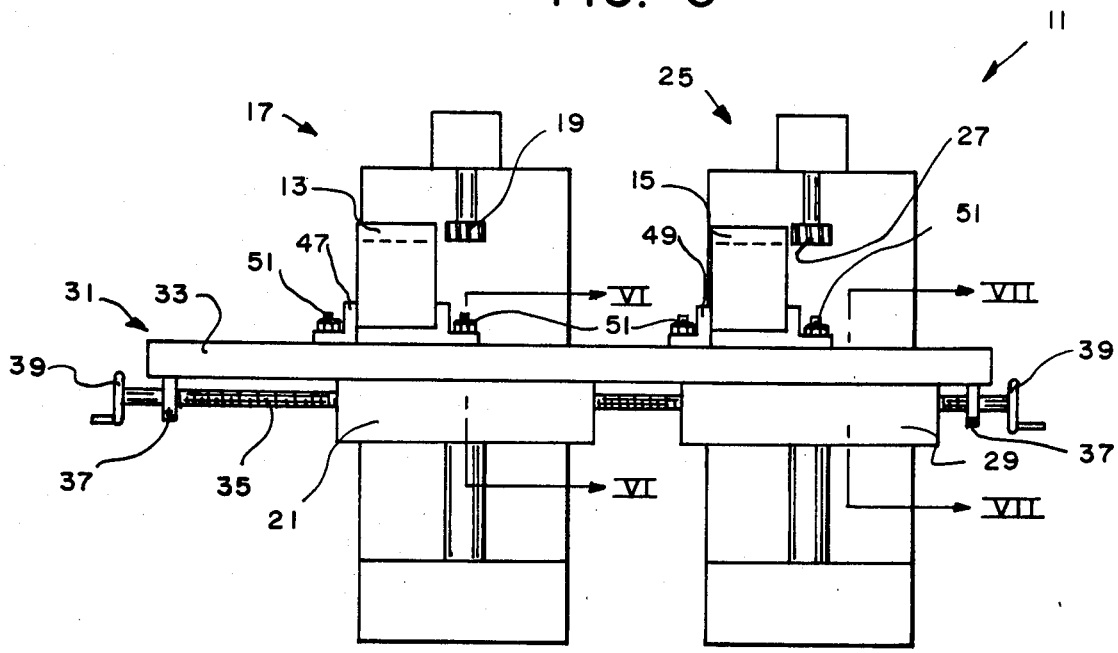
FIG. 5 is a front elevational view similar to FIG. 4 but with the carriage means and workpieces in a moved position.

The milling machine apparatus 11 of the present invention is used to simultaneously mill a first workpiece 13 and a second workpiece 15 (see, in general, FIGS. 4 and 5). The milling machine apparatus 11 thus allows one machinist to perform two milling operations on two separate workpieces simultaneously thus increasing the machinist's efficiency and profitability.

Figure 1:
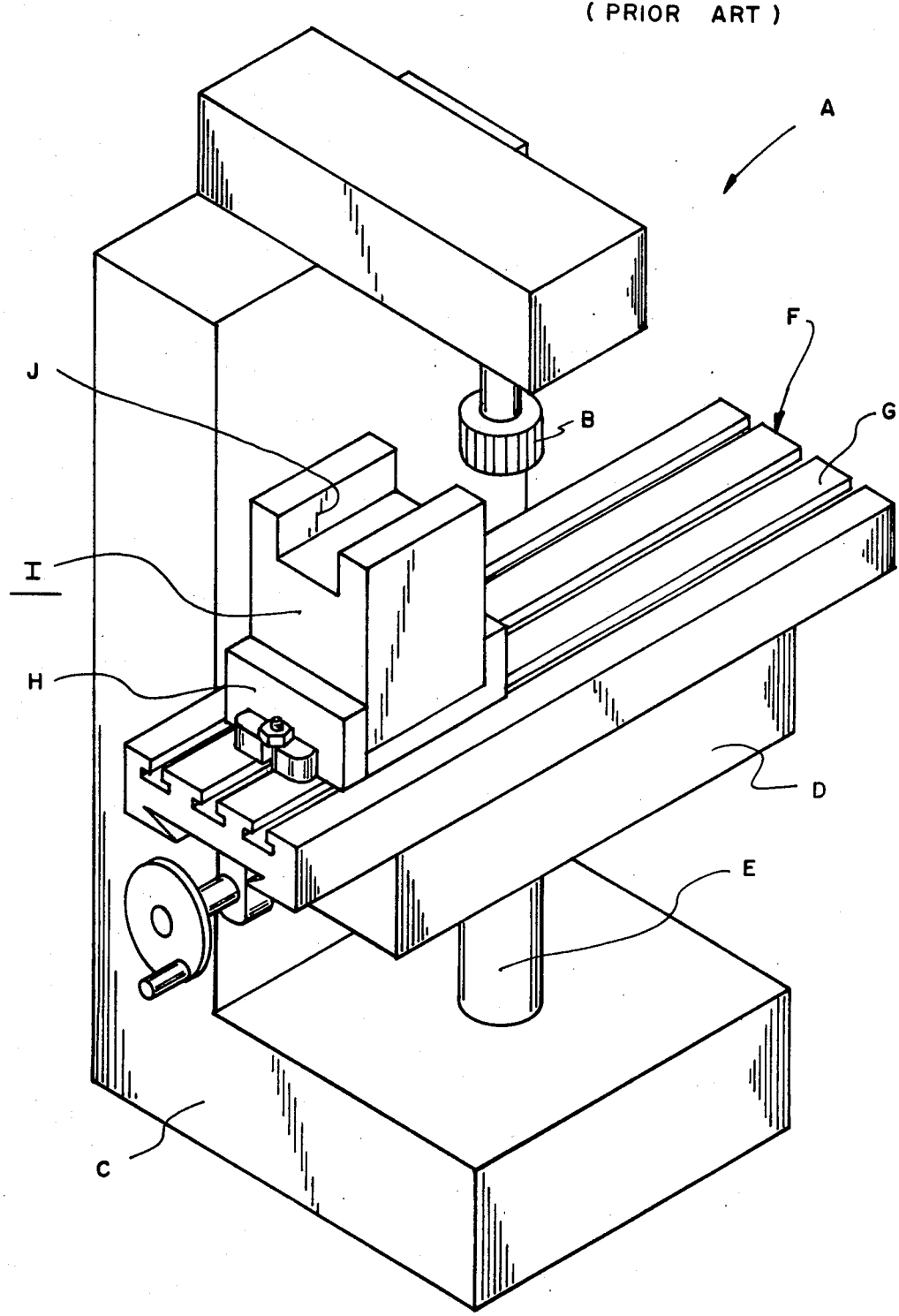
FIG. 1 is a perspective view of a prior art milling machine.
Figure 2:
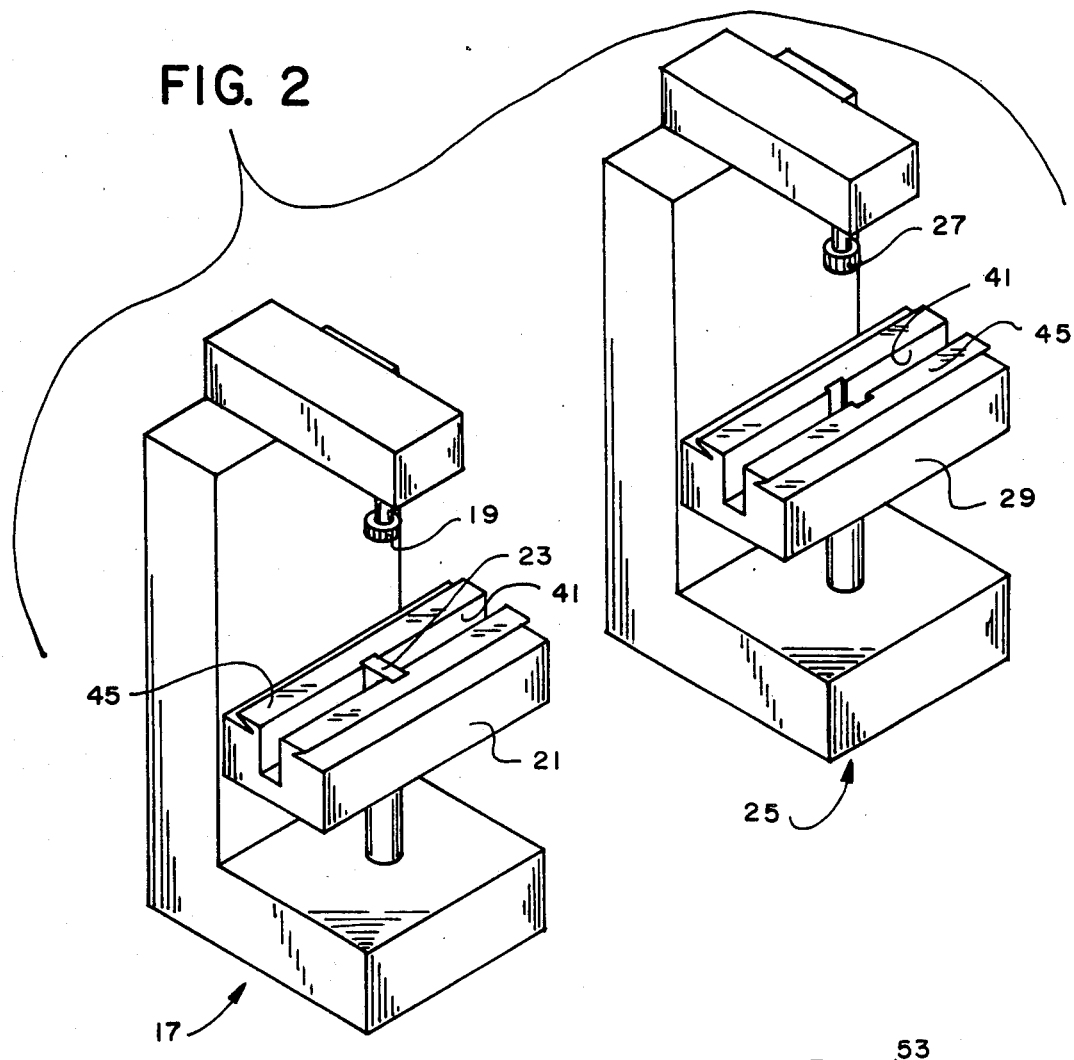
FIG. 2 is a perspective view of the first and second milling machines of the apparatus of the present invention.

The milling machine apparatus 11 includes a first milling machine 17 including a rotating milling cutter 19, a bed 21, and a first drive component 23 (see, in general, FIG. 2). The first milling machine 17 may thus consist of a typical milling machine well known to those skilled in the art with the carriage mechanism thereof removed. The specific construction of the first milling machine 17 may vary as will be apparent to those skilled in the art.

The milling machine apparatus 11 includes a second milling machine 25. The second milling machine 25 includes a rotating milling cutter 27 and a bed 29. Thus, the second milling machine 25 may also consist of a typical milling machine well known to those skilled in the art with the carriage mechanism thereof removed. The specific construction of the second milling machine 25 may vary as will be apparent to those skilled in the art.

Figure 3:
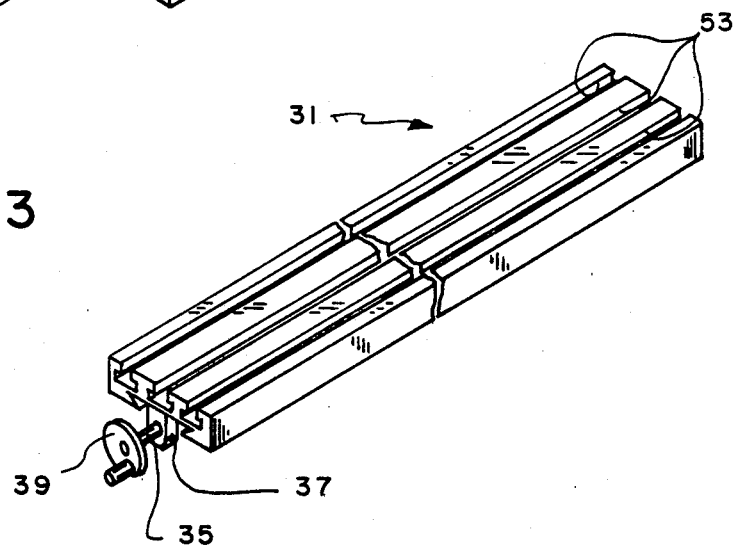
FIG. 3 is a perspective view of the carriage means of the apparatus of the present invention.
Figure 6:
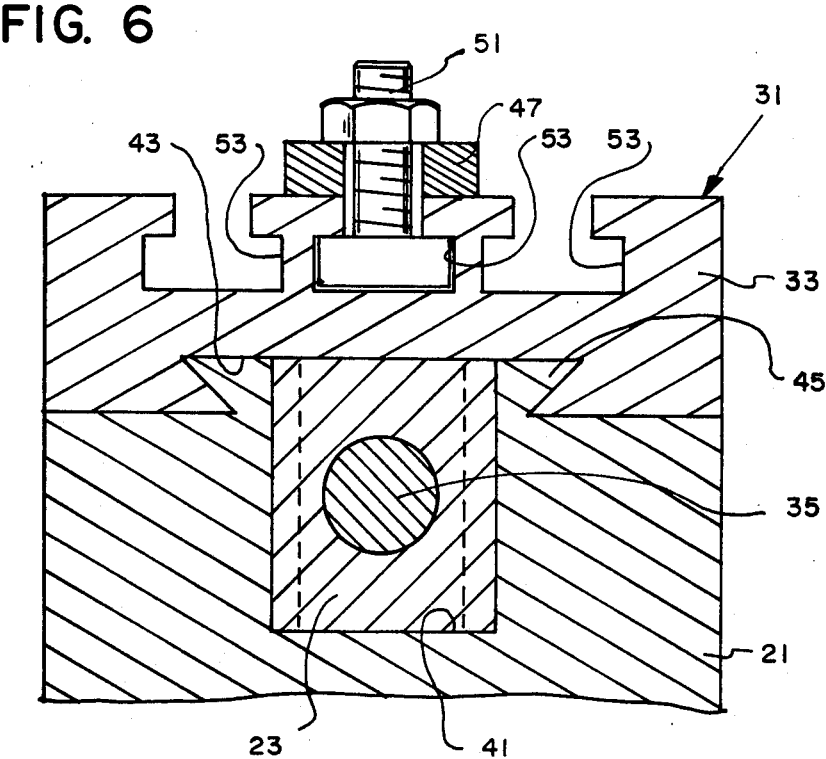
FIG. 6 is an enlarged sectional view substantially as taken on line VI—VI of FIG. 5.

The milling machine apparatus 11 includes a carriage means 31 (see, in general, FIG. 3) extending between the bed 21 of the first milling machine 17 and the bed 29 of the second milling machine 25 (see, in general, FIGS. 4 and 5) for operatively joining the first and second milling machines 17, 25 relative to one another. The carriage means 31 includes an elongated table 33 attached to the beds 21, 29 of the first and second milling machines 17, 25 in a manner which allows longitudinal movement of the table 33 relative to the beds 21, 29 and, therefore, relative to the milling cutters 19, 27 of the first and second milling machines 17, 25. The carriage means 31 also includes a second drive component 35 coupled to the first drive component 23 of the first milling machine 17 (see, in general, FIG. 6) for coacting with the first drive component 23 to cause longitudinal movement of the table 33 relative to the milling cutters 19, 27 of the first and second milling machines 17, 25. Thus, the carriage means 31 may consist of a typical carriage means or mechanism of a standard milling machine sized so as to extend between the first and second milling machines 17, 25. The specific construction of the carriage means 31 may therefore vary as will be apparent to those skilled in the art. Thus, the second drive component 35 may consist of an externally threaded, elongated lead screw or the like extending the entire length of the table 33 and attached thereto by bearing supports 37 or the like. Hand wheels 39 may be fixedly attached to the opposite ends of the second drive component 35 to allow the second drive component 35 to be manually rotated. The second drive component 35 is preferably located beneath the table 33 and a slot 41 may be provided across the beds 21, 29 of the first and second milling machines 17, 25 for allowing the second drive component 35 to extend thereacross. The first drive component 23 may consist simply of an internally threaded nut or the like engaging the second drive component 35 and fixed relative to the bed 21 of the first milling machine 17 whereby rotation of the second drive component 35 relative to the first drive component 23 will cause the carriage means 31 to move in a longitudinal direction relative to the first drive component 23, and therefore, to move in a longitudinal direction relative to the beds 21, 29 and milling cutters 19, 27 of the first and second milling machines 17, 25 in a manner as will now be apparent to those skilled in the art. It should be noted that many milling machines have built-in longitudinal table power feed mechanisms and in such milling machines, the first drive component 23 may consist of a component of a gear train for coacting with the second drive component 35 whereby the power feed mechanism of the milling maching will control the longitudinal movement of the table 33 in a manner well known to those skilled in the art.

Figure 7:
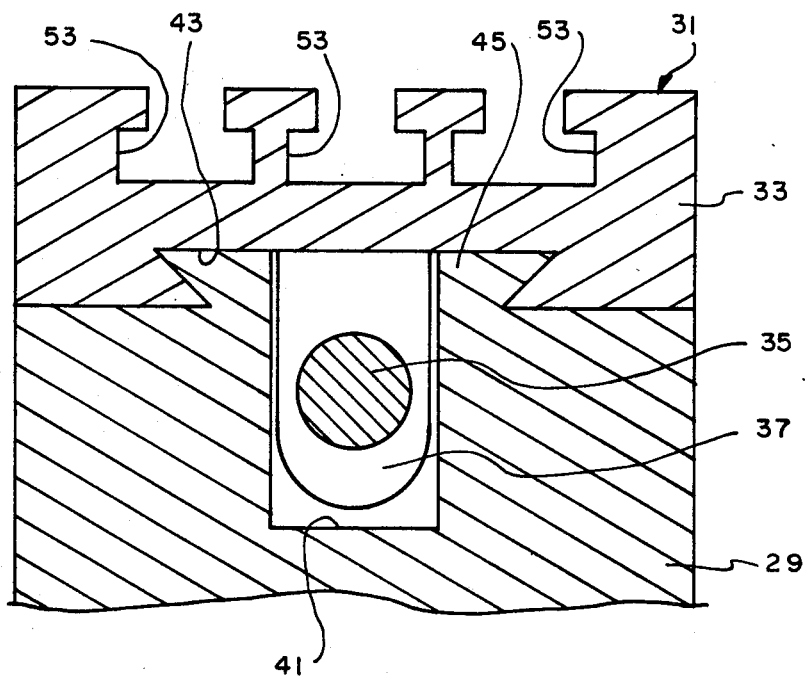
FIG. 7 is an enlarged sectional view substantially as taken on line VII—VII of FIG. 5.

The table 33 may also be coupled to the beds 21, 29 of the first and second milling machines 17, 25 in various typical manners well known to those skilled in the art. Thus, for example, the table 33 may have a longitudinal dove-tail groove 43 thereacross and each bed 21, 29 may have a longitudinal dovetail projection 45 thereacross (see, in general, FIGS. 6 and 7) for engaging the dove-tail groove 43 in the table 33 in a manner which allows the table 33 to slide back and forth across the beds 21, 29.

The milling machne apparatus 11 includes a first work holding means 47 attached to the table 33 for holding the first workpiece 13 with respect to the milling cutter 19 of the first milling machine 17, and includes a second work holding means 49 attached to the table 33 for holding the second workpiece 15 with respect to the milling cutter 27 of the second milling machine 25 (see, in general, FIGS. 4 and 5). The first and second work holding means 47, 49 may consist of any standard work holding fixtures or the like well known to those skilled in the art. Thus, for example, each work holding means 47, 49 may consist of a typical vice or the like well known to those skilled in the art fixedly attachted to the table 33 in any manner well known to those skilled in the art such as by way of standard T-bolt means 51 or the like for coacting with standard T-grooves 53 in the table 33 (see, in general, FIG. 6) as will be well known to those skilled in the art.

Once the carriage mechanism 31 has been attached to the first and second milling machines 17, 25, the operation of the milling machine apparatus 11 is substantially similar to the operation of a standard milling machine. Thus, the first and second workpieces 13, 15 are attached to the table 33 by way of the first and second work holding means 47, 49, respectively, in an exact position depending on the milling operation to be performed thereon in a manner as will be apparent to those skilled in the art. Depending on the type of milling machines used, the table 33 may also be positioned vertically and crosswise in manners well known to those skilled in the art so as to accurately position the workpieces 13, 17. Next, the first and second drive components 23, 25 are operated in the typical manner to move the table 33 longitudinally relative to the beds 21, 29 to feed the workpieces 13, 15 against the milling cutters 19, 27 whereby both workpieces 13, 15 are milled simultaneously by a single control operation thereby allowing a single machinist to simultaneously mill both workpieces 13, 15.

Although the present invention has been described and illustrated with respect to a preferred embodiment thereof and a preferred used therefore, it is not to be so limited since changes and modifications can be made therein which are within the full intended scope of the invention.

I claim:

1. A milling machine apparatus for simultaneously milling a first workpiece and a second workpiece, said first and second workpieces being separate and distinct from one another, said apparatus comprising, in combination:

(a) a first milling machine including a rotating milling cutter, a bed, and a first drive component;

(b) a second milling machine including a rotating milling cutter and a bed;

(c) a carriage means extending between said bed of said first milling machine and said bed of said second milling machine for operatively joining said first and second milling machines relative to one another, said carriage means including an elongated table attached to said bed of said first milling machine and said bed of said second milling machine in a manner which allows longitudinal movement of said table relative to said milling cutters of said first and second milling machines, said carriage means including a second drive component operatively coupled to said first drive component of said first milling machine for coacting with said first drive component to cause longitudinal movement of said table relative to said milling cutters of said first and second milling machines;

(d) a first work holding means attached to said table for holding said first workpiece at a location for being engaged by said milling cutter of said first milling machine when said table is caused to move longitudinally with respect thereto and for allowing said milling cutter of said first milling machine to mill a cut into said first workpiece; and (e) a second work holding means attached to said table for holding said second workpiece at a location for being engaged by said milling cutter of said second milling machine when said table is caused to move longitudinally with respect thereto and for allowing said milling cutter of said second milling machine to mill a cut into said second workpiece at the same time said milling cutter of said first milling machine is milling a cut into said first workpiece and identical with the cut being milled into said first workpiece by said milling cutter of said first milling machine.

2. An improved milling machine apparatus for simultaneously milling identical cuts into separate and distinct first and second workpieces wherein the improvement comprises: a first milling machine with the carriage means thereof removed; a second milling machine with the carriage means thereof removed; and an elongated carriage means extending between said first and second milling machines for operatively joining said first and second milling machines to one another, said elongated carriage means including an elongated table attached to said first milling machine and to said second milling machine in a manner which allows longitudinal movement of said table relative to said first and second milling machines with said first and second workpieces attached to said tabe to allow said first and second workpieces respectively, said first milling machine including a milling cutter for milling a cut into said first workpiece, said second milling machine including a milling cutter for milling a cut into said second workpiece at the same time said milling cutter of said first milling machine is milling a cut into said first workpiece and identical with the cut being milled into said first workpiece by said milling cutter of said first milling machine.

3. A method of modifying or converting two milling machines for simultaneously milling identical cuts into separate and distinct first and second workpieces wherein the method comprises:

(a) removing the carriage means of a first milling machine;
(b) removing the carriage means of a second milling machine; and
(c) operatively joining said first and second milling machines to one another with an elongated carriage means, said elongated carriage means including an elongated table attached to said first milling machine and to said second milling machine in a manner which allows longitudinal movement of said table relative to said first and second milling machines with said first and second workpieces attached to said table to allow said first and second milling machines to simultaneously mill said first and second workpieces respectively with the milling cutter of said first milling machine milling a cut into said first workpiece at the same time the milling cutter of said second milling machien is milling a cut into said second workpiece with said first and second workpieces being moved an identical amount with repsect to said milling cutters of said first and second milling machines respectively to cause identical cuts to be simultaneously milled into said first and second workpieces.

* * * * *